(12) United States Patent
Suzuki

(10) Patent No.: US 12,413,857 B2
(45) Date of Patent: Sep. 9, 2025

(54) FOCUS-OF-EXPANSION LOCATING DEVICE

(71) Applicant: TOYOTA JIDOSHA KABUSHIKI KAISHA, Toyota (JP)

(72) Inventor: Takuma Suzuki, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 18/457,007

(22) Filed: Aug. 28, 2023

(65) Prior Publication Data

US 2024/0179407 A1 May 30, 2024

(30) Foreign Application Priority Data

Nov. 24, 2022 (JP) ................................ 2022-187208

(51) Int. Cl.
*H04N 23/67* (2023.01)
*G06T 7/70* (2017.01)
*G06V 20/56* (2022.01)

(52) U.S. Cl.
CPC ............ *H04N 23/675* (2023.01); *G06T 7/70* (2017.01); *G06V 20/56* (2022.01); *G06T 2207/10148* (2013.01); *G06T 2207/30242* (2013.01); *G06T 2207/30252* (2013.01)

(58) Field of Classification Search
CPC ..................... H04N 23/675; G06T 7/70; G06T 2207/10148; G06T 2207/30242; G06T 2207/30252; G06V 20/56
See application file for complete search history.

(56) References Cited

U.S. PATENT DOCUMENTS

| | | | |
|---|---|---|---|
| 10,427,689 B2 | 10/2019 | Tokimasa et al. | |
| 10,486,698 B2 | 11/2019 | Masui et al. | |
| 10,731,996 B2 | 8/2020 | Naito | |
| 10,922,561 B2 | 2/2021 | Ozawa et al. | |
| 11,017,247 B2 | 5/2021 | Hayashi et al. | |
| 11,072,328 B2 | 7/2021 | Masui et al. | |
| 11,235,766 B2 | 2/2022 | Masui et al. | |
| 11,247,671 B2 | 2/2022 | Komori | |
| 2007/0282531 A1 | 12/2007 | Park et al. | |
| 2018/0365859 A1* | 12/2018 | Oba | B60W 40/114 |
| 2019/0359134 A1* | 11/2019 | Yamamoto | B62D 13/00 |
| 2020/0001922 A1* | 1/2020 | Yamamoto | B62D 15/029 |
| 2020/0276989 A1* | 9/2020 | Garcia | G01S 19/42 |
| 2020/0326191 A1 | 10/2020 | Naito | |
| 2021/0056322 A1* | 2/2021 | Hasegawa | G01S 13/08 |
| 2021/0364631 A1 | 11/2021 | Hasegawa et al. | |
| 2023/0415528 A1* | 12/2023 | Horikawa | B60D 1/248 |

FOREIGN PATENT DOCUMENTS

| | | |
|---|---|---|
| JP | H09-189517 A | 7/1997 |
| JP | 2012-045706 A | 3/2012 |
| WO | 2017/122552 A1 | 7/2017 |

\* cited by examiner

*Primary Examiner* — Hung H Lam
(74) *Attorney, Agent, or Firm* — SoraIP, Inc.

(57) ABSTRACT

The focus-of-expansion locating device includes a loaded state determination unit and a focus-of-expansion locating unit. The loaded state determination unit determines whether the loaded state of the vehicle has changed based on the detection result from the in-vehicle sensor that detects the loaded state of the vehicle. The focus-of-expansion locating unit locates a focus of expansion on the captured image based on the captured image of the camera of the vehicle. The focus-of-expansion locating unit re-locates the focus of expansion when the loaded state has changed.

2 Claims, 6 Drawing Sheets

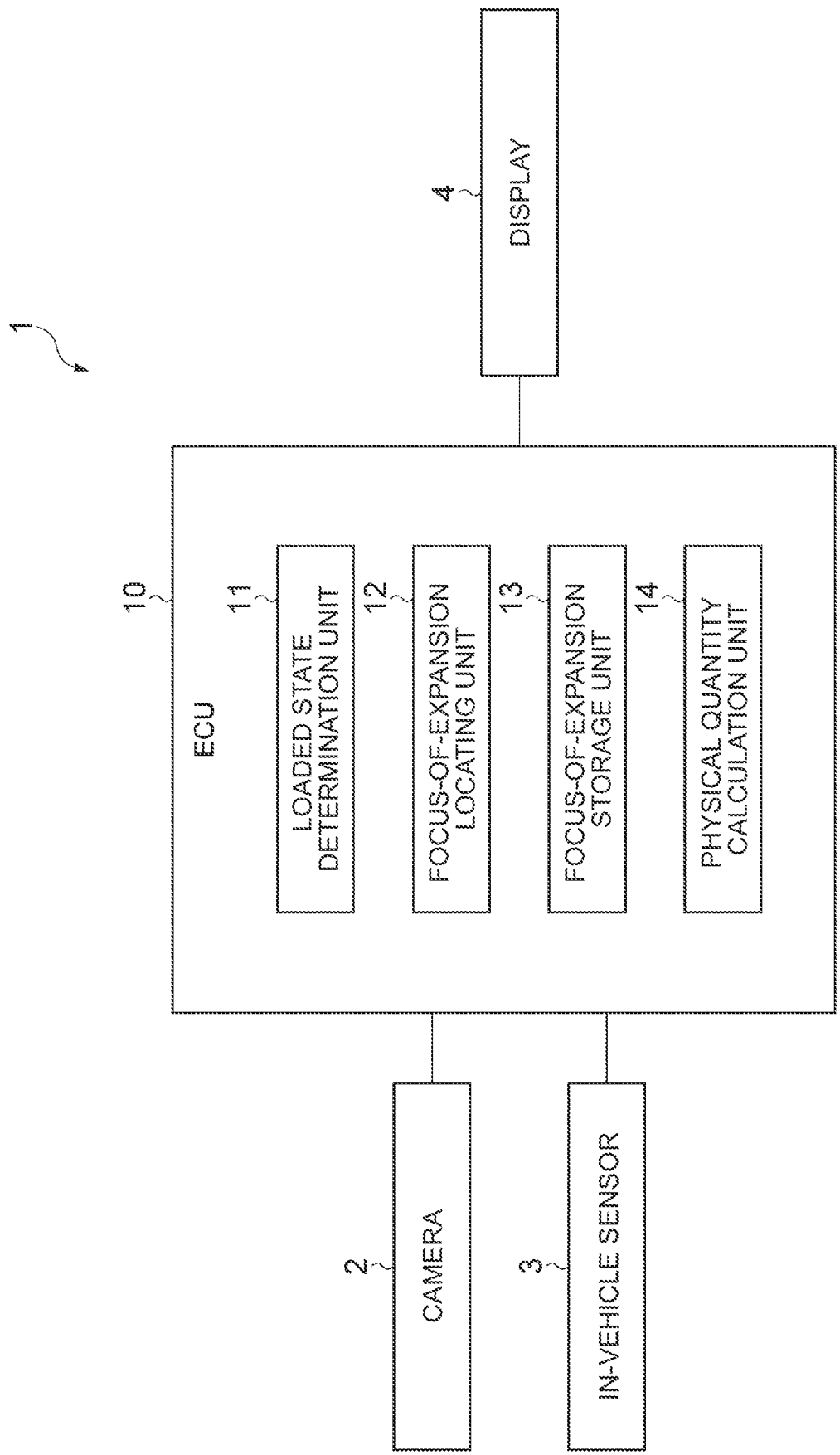

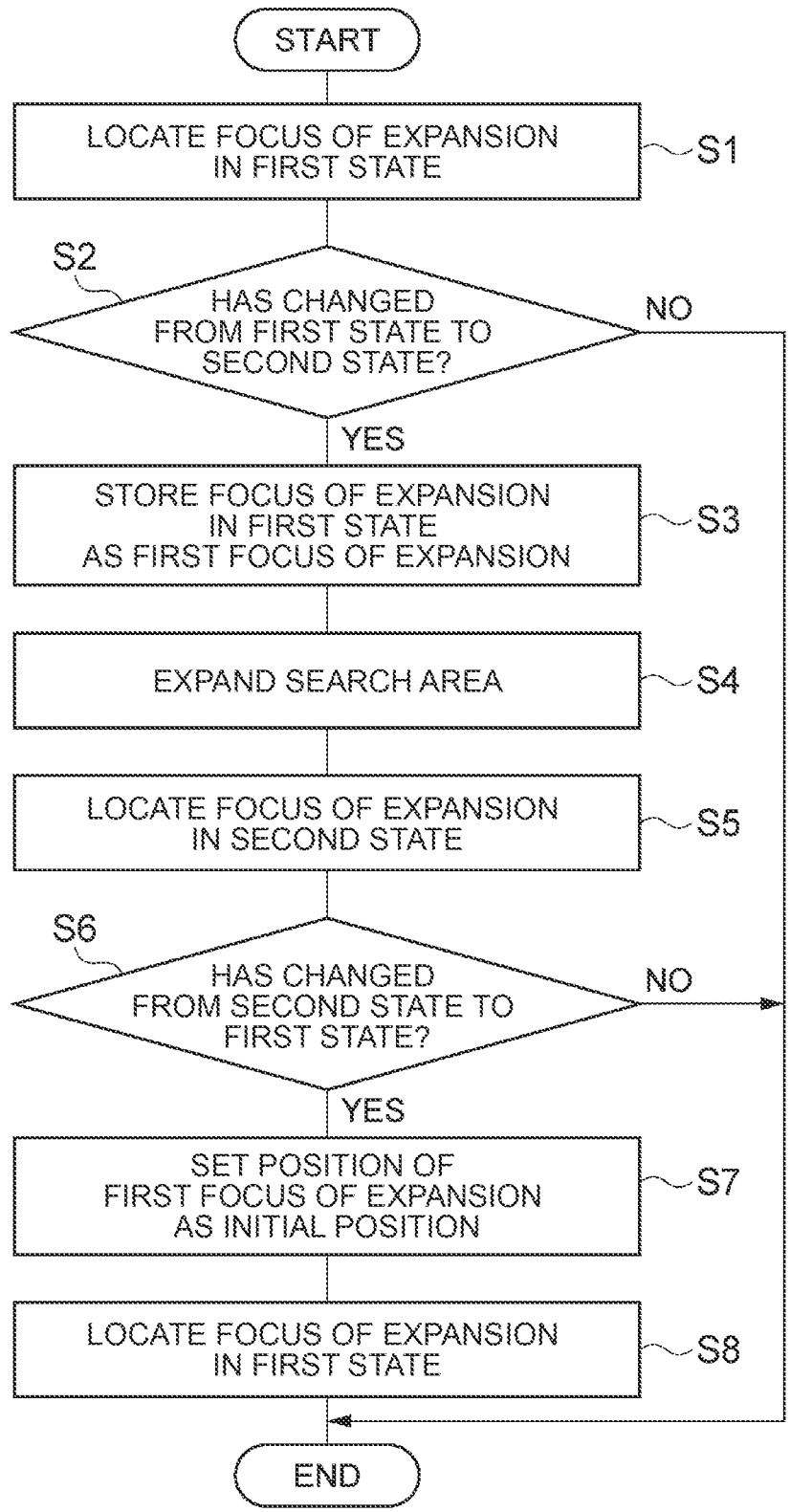

FOCUS-OF-EXPANSION LOCATING DEVICE

CROSS-REFERENCE TO RELATED APPLICATION

This application claims priority to Japanese Patent Application No. 2022-187208 filed on Nov. 24, 2022, incorporated herein by reference in its entirety.

BACKGROUND

1. Technical Field

The present disclosure relates to focus-of-expansion locating devices.

2. Description of Related Art

Japanese Unexamined Patent Application Publication No. 2012-045706 (JP 2012-045706 A) is known as a technical document about a focus-of-expansion locating device. JP 2012-045706 A discloses a technique of locating, based on an image captured by a camera, a focus of expansion in the captured image, and using the focus of expansion to calculate a physical quantity such as time of contact (TOC).

SUMMARY

In the related art as described above, once a focus of expansion is located, this focus of expansion is continuously used for a predetermined period of time. However, if, for example, the orientation of the camera changes during the predetermined period of time, the position of the focus of expansion in the captured image may deviate from a correct position.

It is an object of the present disclosure to provide a focus-of-expansion locating device that can re-locate a focus of expansion at an appropriate timing.

A focus-of-expansion locating device of the present disclosure includes: a loaded state determination unit configured to determine whether a loaded state of a vehicle has changed based on a detection result from an in-vehicle sensor configured to detect the loaded state of the vehicle; and a focus-of-expansion locating unit configured to locate, based on an image captured by a camera of the vehicle, a focus of expansion in the captured image. The focus-of-expansion locating unit re-locates the focus of expansion when the loaded state has changed.

According to the present disclosure, a focus-of-expansion locating device can be provided that can re-locate a focus of expansion at an appropriate timing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram of a focus-of-expansion locating device according to an embodiment;

FIG. 6 is a flowchart showing a process performed by the focus-of-expansion locating device shown in FIG. 1.

DETAILED DESCRIPTION OF EMBODIMENTS

Hereinafter, embodiments of the present disclosure will be described with reference to the drawings.

FIG. 1 is a block diagram of a focus-of-expansion locating device according to an embodiment. As illustrated in FIG. 1, the focus-of-expansion locating device 1 includes a camera 2, an in-vehicle sensor 3, a display 4, and an Electronic Control Unit (ECU) 10. The focus-of-expansion locating device 1 is a device for locating a focus of expansion (FOE).

The focus of expansion is a point of infinite distance. A plurality of straight lines parallel to the predetermined direction intersects at focuses of expansion when viewed from the predetermined direction. When the viewpoint (e.g., the human eye) is advancing along a direction parallel to the line of sight, a plurality of objects appearing in the field of view move along a radial trajectory starting from the focus of expansion.

Figure 2A:
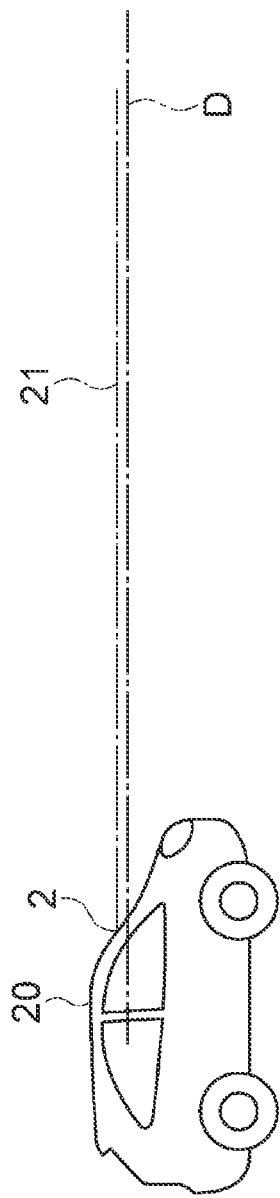
FIG. 2A is a diagram illustrating a change in attitude of the vehicle when the loaded state has changed.
Figure 2B:
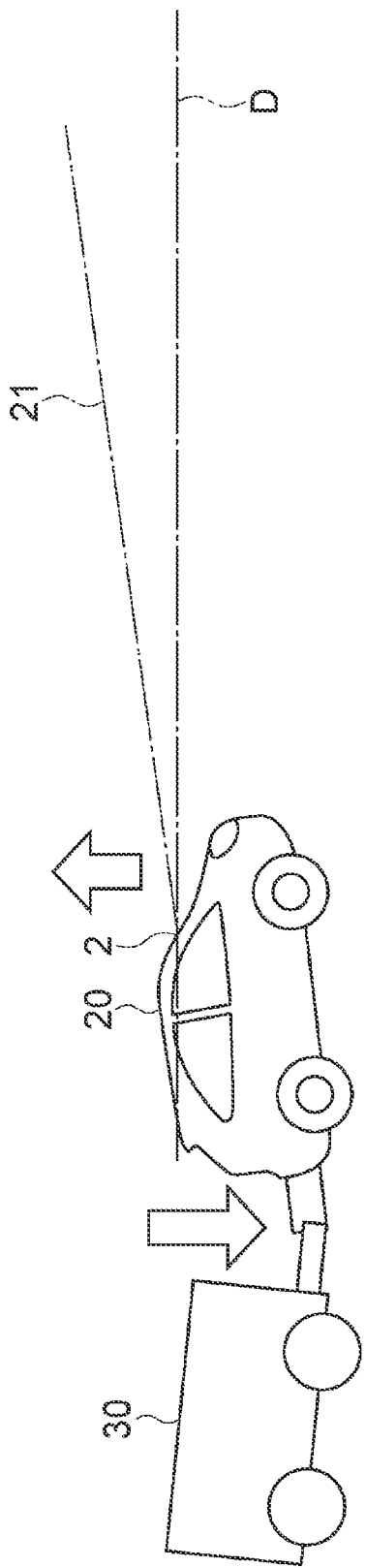
FIG. 2B is a diagram illustrating a change in attitude of the vehicle when the loaded state has changed.

The camera 2 is provided in the cabin of the vehicle 20 (see FIG. 2A and FIG. 2B). The camera 2 is fixed to the vehicle 20. The camera 2 captures an image of the front of the vehicle 20 via, for example, a windshield of the vehicle 20. The camera 2 is, for example, a monocular camera. The camera 2 may be, for example, a stereo camera. The camera 2 transmits the captured images to ECU 10.

The in-vehicle sensor 3 detects a loaded state of the vehicle 20. The loaded state of the vehicle 20 is an index corresponding to a weight of a load, an occupant, or the like conveyed by the vehicle 20. In the present embodiment, the loaded state of the vehicle 20 is the number of towed vehicles 30 (see FIG. 2B of the drawings) connected to the vehicle 20. That is, the in-vehicle sensor 3 detects the number of towed vehicles 30 connected to the vehicle 20. The in-vehicle sensor 3 is, for example, a Trailer detection module (TDM). The in-vehicle sensor 3 sends the loaded state of the vehicles 20 to the ECU 10.

The display 4 is provided, for example, on an instrument panel of the vehicle 20. The display 4 has a display screen for displaying an image. The display 4 displays images on a display screen based on control signals from ECU 10. The display 4 displays, for example, a captured image of the camera 2. The display 4 may be, for example, a windshield of the vehicle 20 or a Head Up Display (HUD) for displaying a projection on a projection screen.

ECU 10 is an electronic control unit having a Central Processing Unit (CPU) and a storage. The storage unit is, for example, Read Only Memory (ROM) or Random Access Memory (RAM). In ECU 10, for example, various functions are realized by executing a program stored in a storage unit by a CPU.

FIG. 2A and FIG. 2B are diagrams illustrating a change in attitude of the vehicle 20 when the loaded state has changed. FIG. 2A illustrates a case where the loaded state of the vehicles 20 is the first state. FIG. 2B illustrates a case where the loaded state of the vehicles 20 is the second state. The number of towed vehicles 30 in the second state is larger than the number of towed vehicles 30 in the first state. In the present embodiment, the number of towed vehicles 30 in the first state is "0", and the number of towed vehicles 30 in the second state is "1".

As shown in FIG. 2A, in the first condition, the optical axis 21 of the camera 2 is substantially parallel to the traveling direction (e.g., horizontal direction) D of the vehicle 20. That is, in the first state, the camera 2 faces the front of the vehicle 20 in the horizontal direction. As shown in FIG. 2B, in the second state, since the towed vehicle 30 is connected to the rear of the vehicle 20, the front end of the vehicle 20 is displaced upward in the vertical direction and the rear end of the vehicle 20 is displaced downward in the vertical direction as compared with the first state. That is, the attitude of the vehicle 20 in the first state and the attitude of the vehicle 20 in the second state are different from each other.

Since the camera 2 is fixed to the vehicle 20, the orientation of the camera 2 also changes when the attitude of the vehicle 20 changes. In the second state, the optical axis 21 of the camera 2 intersects the traveling direction D of the vehicle 20. That is, in the case of the second state, the camera 2 faces upward in the vertical direction with respect to the horizontal direction. As described above, even when the traveling direction D of the vehicle 20 has not changed, the orientation of the camera 2 may change. When the orientation of the camera 2 changes, the position of the focus of expansion in the captured image of the camera 2 also changes. Therefore, for example, if the focus of expansion of the first state continues to be used even in the second state, it may be difficult to accurately calculate the physical quantity of the second state.

ECU 10 includes, as a functional configuration, a loaded state determination unit 11, a focus-of-expansion locating unit 12, a focus-of-expansion storage unit 13, and a physical quantity calculation unit 14.

The loaded state determination unit 11 determines the loaded state of the vehicle 20 based on the detection result of the in-vehicle sensor 3. The loaded state determination unit 11 determines whether or not the towed vehicle 30 is connected to the vehicle 20. The loaded state determination unit 11 determines the number of towed vehicles 30 connected to the vehicle 20.

The loaded state determination unit 11 determines whether or not the loaded state of the vehicle 20 has changed based on the detection result of the in-vehicle sensor 3. The loaded state determination unit 11 determines whether or not the number of towed vehicles 30 connected to the vehicle 20 has increased. The loaded state determination unit 11 determines whether or not the number of towed vehicles 30 connected to the vehicle 20 has decreased. The loaded state determination unit 11 determines that the loaded state of the vehicle 20 has changed when the number of towed vehicles 30 connected to the vehicle 20 has changed.

The focus-of-expansion locating unit 12 locates a focus of expansion on the captured image based on the captured image of the camera 2 of the vehicle 20. The focus-of-expansion locating unit 12 re-locates a focus of expansion when the loaded state of the vehicle 20 has changed. The focus-of-expansion locating unit 12 locates a focus of expansion each time the loaded state of the vehicle 20 changes. The focus-of-expansion locating unit 12 locates a focus of expansion by various known methods.

Figure 3A:
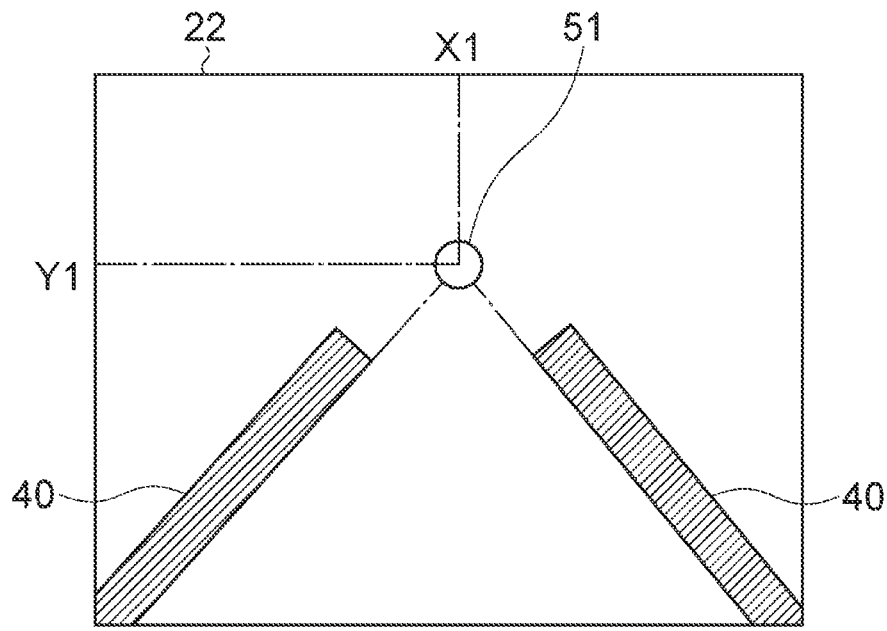
FIG. 3A is a diagram illustrating a change in focus of expansion when the loaded state has changed.

FIG. 3A shows captured images of the camera 2 in the first condition. As shown in FIG. 3A, the captured images 22 have, for example, a pair of lane boundary lines 40 that are parallel to each other. The focus-of-expansion locating unit 12 extracts the pair of lane boundary lines 40 and locates the intersection of the extension lines of the pair of lane boundary lines 40 as the focus of expansion 51 in the first state.

The abscissa X1 of the focus of expansion 51 in the captured image 22 is, for example, 100 pixels. The ordinate Y1 of the focus of expansion 51 in the captured image 22 is, for example, 100 pixels. That is, the focus of expansion 51 is 100 pixels away from the left end of the captured image 22 and 100 pixels away from the lower end of the captured image 22.

Figure 3B:
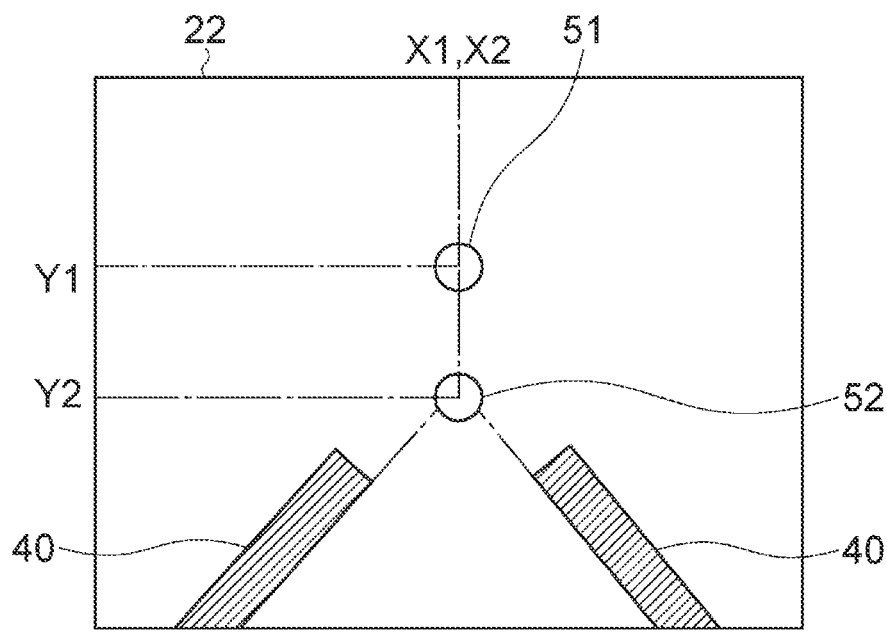
FIG. 3B is a diagram showing a change in focus of expansion when the loaded state has changed.

FIG. 3B shows the captured images of the cameras 2 in the second condition. The focus-of-expansion locating unit 12 extracts the pair of lane boundary lines 40 and locates the intersection of the extension lines of the pair of lane boundary lines 40 as the focus of expansion 52 in the second state. As described above, in the case of the first state, the camera 2 faces the front of the vehicle 20 in the horizontal direction, whereas in the case of the second state, the camera 2 faces the upper side in the vertical direction with respect to the horizontal direction. Therefore, in the captured image 22, the focus of expansion 52 in the second state is located below the focus of expansion 51 in the first state.

The abscissa X2 of the focus of expansion 52 in the captured image 22 is the same as the abscissa X1 of the focus of expansion 51 in the captured image 22. The ordinate Y2 of the focus of expansion 52 in the captured image 22 is smaller than the ordinate Y1 of the focus of expansion 51 in the captured image 22. The ordinate Y2 of the focus of expansion 52 in the captured image 22 is, for example, 80 pixels. That is, the focus of expansion 52 is 100 pixels away from the left end of the captured image 22 and 80 pixels away from the lower end of the captured image 22.

The focus-of-expansion storage unit 13 stores the focuses of expansion 51, 52 located by the focus-of-expansion locating unit 12. The focus-of-expansion storage unit 13 stores the focus of expansion 51 in the case where the loaded state of the vehicle 20 is the first state as the first focus of expansion, and stores the focus of expansion 52 in the case where the loaded state of the vehicle 20 is the second state as the second focus of expansion. The focus-of-expansion storage unit 13 stores focuses of expansion for each loaded state of the vehicle 20.

Figure 4:
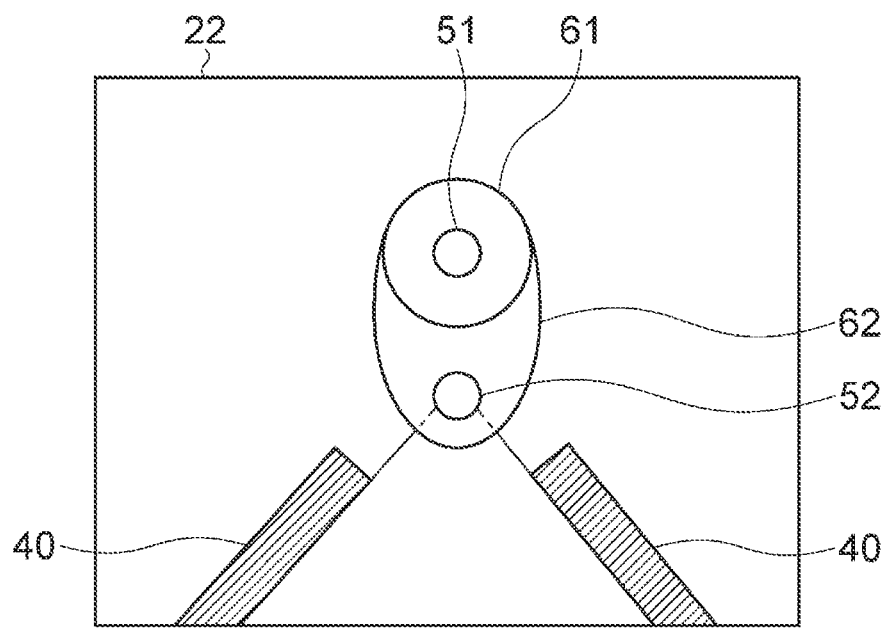
FIG. 4 is a diagram illustrating a search area for locating a focus of expansion.

The focus-of-expansion locating unit 12 locates a focus of expansion in a predetermined search area of the captured image 22 using the initial position as a starting point. FIG. 4 is a diagram illustrating a search area for locating a focus of expansion. As illustrated in FIG. 4, in the case of the first state, the focus-of-expansion locating unit 12 locates the focus of expansion 51 in the search area 61 using the initial position as a starting point. The initial position is the position of the focus of expansion immediately before the change in loaded state. When calculating the first focus of expansion after the start of the vehicle 20, the focus-of-expansion locating unit 12 may locate a focus of expansion using a pre-stored initial position as a starting point.

When the loaded state of the vehicle 20 has changed, the focus-of-expansion locating unit 12 re-locates a new focus of expansion after the change in loaded state by using the position of the focus of expansion immediately before the change in loaded state as an initial position. When the vehicle 20 has changed from the first state to the second state, the focus-of-expansion locating unit 12 re-locates a focus of expansion 52 in the search area 62 using the position of the focus of expansion 51 (first focus of expansion) as an initial position. The search area 62 is larger than the search area 61. That is, when the loaded state of the vehicle 20 has changed, the focus-of-expansion locating unit 12 expands the search area and re-locates a new focus of expansion.

When the focus of expansion 51 is stored in the focus-of-expansion storage unit 13 and the loaded state of the vehicle 20 has changed from the other than the first state to the first state, the focus-of-expansion locating unit 12 re-locates a focus of expansion using the position of the focus of expansion 51 as an initial position. For example, when the loaded state of the vehicle 20 changed from the first state to the second state and then has returned to the first state, the focus-of-expansion locating unit 12 re-locates the focus of expansion when the loaded state of the vehicle 20 has returned to the first state, by using the position of the focus of expansion 51 (first focus of expansion) rather than the focus of expansion 52 (second focus of expansion) as an initial position.

Figure 5:
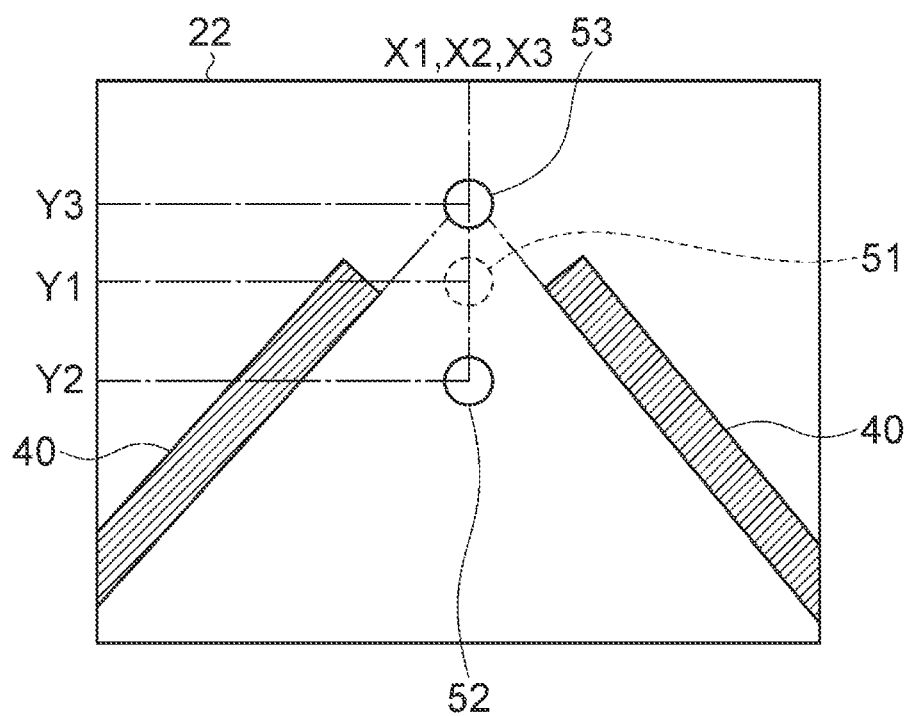
FIG. 5 is a diagram illustrating a change in focus of expansion when the loaded state has changed.

FIG. 5 is a diagram illustrating a change in focus of expansion when the loaded state of the vehicle 20 has returned to the first state after changing from the first state to the second state. As shown in FIG. 5, the position of the focus of expansion 53 when the loaded state of the vehicle 20 is returned to the first state after changing from the first state to the second state may be different from the position of the focus of expansion 51 of the first state before changing to the second state. This is considered to be due to, for example, a decrease in the fuel of the vehicle 20 or a change in load weight of the towed vehicle 30 while the vehicle 20 returns to the first state after the loaded state changed from the first state to the second state.

The abscissa X3 of the focus of expansion 53 in the captured image 22 is the same as the abscissa X1 of the focus of expansion 51 in the captured image 22. The ordinate Y3 of the focus of expansion 53 in the captured image 22 is larger than the ordinate Y1 of the focus of expansion 51 in the captured image 22. The ordinate Y3 of the focus of expansion 53 in the captured image 22 is, for example, 120 pixels. That is, the focus of expansion 53 is 100 pixels away from the left end of the captured image 22 and 120 pixels away from the lower end of the captured image 22.

Although the position of the focus of expansion 53 is different from the position of the focus of expansion 51, since the focus of expansion 53 and the focus of expansion 51 are focuses of expansion in the same loaded state (first state), the position of the focus of expansion 53 tends to be closer to the focus of expansion 51 than the focus of expansion 52 in the second state. Therefore, in a case where the focus of expansion 53 is located using the position of the focus of expansion 51 as an initial position, the learning efficiency of the focus of expansion is improved as compared with the case where the focus of expansion 53 is located using the position of the focus of expansion 52 as an initial position.

The physical quantity calculation unit 14 calculates each physical quantity based on the latest focus of expansion located by the focus-of-expansion locating unit 12. The physical quantity calculation unit 14 calculates the distance between the obstacle and the vehicle 20 based on, for example, the distance between the obstacle and the focus of expansion in the captured image 22.

Next, the ECU 10 process will be described. FIG. 6 is a flow chart illustrating a process performed by the ECU 10. As shown in FIG. 6, the ECU 10 locates the focus of expansion 51 in the first condition in S1.

The ECU 10 determines, in S2, whether the loaded state of the vehicles 20 has changed from the first state to the second state. That is, the ECU 10 determines whether or not the number of towed vehicles 30 connected to the vehicle 20 has increased to the number of second-state vehicles in S2. When the loaded state of the vehicles 20 has changed from the first state to the second state (S2: YES), the ECU 10 proceeds to S3. When the loaded state of the vehicles 20 does not change from the first state to the second state (S2: NO), the ECU 10 ends the present process.

The ECU 10 stores, in S3, the focus of expansion 51 in the first condition as the first focus of expansion. The ECU 10 expands the search area in S4. The ECU 10 locates a focus of expansion 52 in the second condition in S5. In S5, the ECU 10 locates the focus of expansion 52 in the second state in the search area 62 enlarged by S4 with the position of the focus of expansion 51 in the first state as the starting position.

The ECU 10 determines, in S6, whether the loaded state of the vehicles 20 has changed from the second state to the first state. That is, the ECU 10 determines, in S6, whether or not the number of towed vehicles 30 connected to the vehicle 20 has decreased to the first number. When the loaded state of the vehicles 20 has changed from the second state to the first state (S6: YES), the ECU 10 proceeds to S7. When the loaded state of the vehicles 20 does not change from the second state to the first state (S6: NO), the ECU 10 ends the present process.

In S7, the ECU 10 sets the position of the focus of expansion 51 (the first focus of expansion) in the first state stored in S3 as the default position, instead of the focus of expansion 52 (the second focus of expansion) in the second state. In S8, the ECU 10 locates a new focus of expansion 53 in the first condition starting from the default position set in S7.

As described above, in the focus-of-expansion locating device 1, the focus-of-expansion locating unit 12 re-locates the focus of expansion when the loaded state of the vehicle 20 has changed. Thus, even if the orientation of the camera 2 has changed due to a change in loaded state of the vehicle 20, it is possible to re-locate a new focus of expansion at an appropriate timing. That is, since the focus-of-expansion locating unit 12 locates a focus of expansion by using a change in loaded state of the vehicle 20 as a trigger, it is possible to re-locate a new focus of expansion without waiting until the normal location start condition is satisfied. Therefore, it is possible to prevent the focus of expansion deviated from the accurate position from being used for calculating the physical quantity. Therefore, according to the focus-of-expansion locating device 1, it is possible to calculate the physical quantity with high accuracy.

The in-vehicle sensor 3 detects the number of towed vehicles 30 connected to the vehicle 20. The loaded state determination unit 11 determines that the loaded state of the vehicle 20 has changed when the number of towed vehicles 30 has changed. When the number of towed vehicles 30 changes, a change in attitude of the vehicle 20 tends to be relatively large. When the change in attitude of the vehicle 20 is large, the change in orientation of the camera 2 of the vehicle 20 also tends to be relatively large. In such a case, there is a possibility that the focus of expansion may deviate from the correct position by a relatively large amount, and the above-described effect becomes particularly remarkable.

The focus-of-expansion storage unit 13 stores the focus of expansion 51 in a case where the loaded state of the vehicle 20 is the first state as the first focus of expansion. In the case where the first focus of expansion is stored in the focus-of-expansion storage unit 13, the focus-of-expansion locating unit 12 re-locates the focus of expansion 52 using the position of the focus of expansion 51 as an initial position when the loaded state of the vehicle 20 has changed from a state other than the first state to the first state. Accordingly, when the loaded state of the vehicle 20 has returned from a state other than the first state to the first state, the position of the focus of expansion 51 (first focus of expansion) is used as an initial position to re-locate the new focus of expansion 53 in the first state, and therefore, it is possible to locate the new focus of expansion 53 in the first state more efficiently than in the case where the position of the focus of expansion 52 (second focus of expansion) is used as the initial position to re-locate the new focus of expansion 53 in the first state.

Although the embodiments of the present disclosure have been described above, the present disclosure is not limited to the above-described embodiments. The present disclosure may be embodied in various forms with various changes and modifications, including the above-described embodiments, based on the knowledge of those skilled in the art.

Although an example has been shown in which the camera 2 of the vehicle 20 captures an image of the front of the vehicle 20, the camera 2 may capture an image of the rear of the vehicle 20 via the rear glass of the vehicle 20.

Although an example has been shown in which the number of towed vehicles 30 in the first state is "0" and the number of towed vehicles 30 in the second state is "1", the number of towed vehicles 30 in the first state may be "1" or more and the number of towed vehicles 30 in the second state may be "2" or more. The number of towed vehicles 30 in the first state may be different from the number of towed vehicles 30 in the second state. The number of towed vehicles 30 in the second state may be smaller than the number of towed vehicles 30 in the first state.

Although an example of the number of towed vehicles 30 is shown as the loaded state of the vehicle 20, the loaded state of the vehicle 20 may be an index corresponding to the weight of the occupant. In this case, the in-vehicle sensor 3 may detect, for example, the number of seatbelts mounted on the vehicle 20. The loaded state determination unit 11 may determine that the loaded state of the vehicle 20 has changed when the number of seatbelts attached has changed. The in-vehicle sensor 3 may be a load sensor provided in a seat or a load sensor provided in a load bed.

ECU 10 may not include the physical quantity calculation unit 14. That is, the focuses of expansion 51, 52, and 53 located by the focus-of-expansion locating unit 12 may not be used to calculate the physical quantity. The vehicle 20 may be an autonomous vehicle.

What is claimed is:

1. A focus-of-expansion locating device comprising:
   a processor; and
   a memory storing instructions that are executable by the processor and that cause the processor to
   determine whether a loaded state of a vehicle has changed based on a detection result from an in-vehicle sensor configured to detect the loaded state of the vehicle,
   locate, based on an image captured by a camera of the vehicle, a focus of expansion in the captured image, and
   re-locate the focus of expansion when the loaded state has changed, wherein
   the in-vehicle sensor is configured to detect the number of towed vehicles connected to the vehicle, and
   the processor is configured to determine that the loaded state has changed when the number of towed vehicles has changed.

2. The focus-of-expansion locating device according to claim 1, wherein the processor is configured to:
   store the focus of expansion when the loaded state is a first state as a first focus of expansion; and
   re-locate the focus of expansion using a position of the first focus of expansion as an initial position when the first focus of expansion is stored and the loaded state has changed from a state other than the first state to the first state.

* * * * *